United States Patent [19]

Labana et al.

[11] 3,880,946
[45] Apr. 29, 1975

[54] POWDER PAINT COMPOSITIONS INCLUDING CARBOXYL TERMINATED POLYETHER CROSSLINKING AGENT

[75] Inventors: Santokh S. Labana, Dearborn Heights; Yun-Feng Chang, Plymouth, both of Mich.

[73] Assignee: Ford Motor Company, Dearborn, Mich.

[22] Filed: Dec. 18, 1973

[21] Appl. No.: 425,744

[52] U.S. Cl. .... 260/830 R; 260/30.6 R; 260/31.8 E; 260/37 EP; 260/42.28; 260/824 EP; 260/830 TW; 260/835; 260/836; 260/DIG. 16; 260/DIG. 17
[51] Int. Cl. .................... C08g 45/04; C08g 45/06
[58] Field of Search ...................... 260/836, 830 R

[56] References Cited
UNITED STATES PATENTS

| | | | |
|---|---|---|---|
| 3,070,564 | 12/1962 | Roeser | 260/836 |
| 3,222,419 | 12/1965 | Jubilee | 260/836 |
| 3,297,621 | 1/1967 | Taft | 260/836 |
| 3,514,419 | 5/1970 | Darlow | 260/836 |
| 3,595,944 | 7/1971 | Manning | 260/836 |
| 3,781,380 | 12/1973 | Labana | 260/830 TW |
| 3,808,114 | 4/1974 | Tsuchihara | 260/836 |

*Primary Examiner*—Paul Lieberman
*Attorney, Agent, or Firm*—Roger L. May; Keith L. Zerschling

[57] ABSTRACT

Powder coating compositions are disclosed which, exclusive of pigments and non-reactive components, comprise a coreactive mixture of: (A) a copolymer of between about 8 and about 30 weight percent of a glycidyl ester of a monoethylenically unsaturated acid and between about 92 and about 70 weight percent of other monoethylenically unsaturated monomers, said copolymer having a glass transition temperature in the range of 40°C to 90°C and a number average molecular weight ($M_n$) of between about 2500 and about 8500; and (B) a carboxyl terminated polyether crosslinking agent in an amount of between about 0.8 and about 1.2 carboxyl groups for each epoxy group in the copolymer.

18 Claims, No Drawings

3,880,946

POWDER PAINT COMPOSITIONS INCLUDING CARBOXYL TERMINATED POLYETHER CROSSLINKING AGENT

This application relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints contain large amounts of solvents which must be volatilized after application, thus resulting in solvents escaping into the atmosphere and creating health and safety hazards as well as undesirable pollution problems. The powder coating compositions of this invention, on the other hand, release little, if any volatile material when cured. In addition, the powders have good stability at room temperature, have fast cure times at elevated temperatures and form hard coatings exhibiting excellent solvent resistance.

SUMMARY OF THE INVENTION

The powder coating compositions of this invention, exclusive of pigments and other nonreactive components, comprise a coreactable mixture of: (A) a copolymer of between about 8 and about 30 weight percent of glycidyl ester of monoethylenically unsaturated acid and between about 92 and about 70 weight percent of other monoethylenically unsaturated monomers, said copolymer having a glass transition temperature in the range of 40°C to 90°C and a number average molecular weight ($\overline{M}_n$) of between about 2500 and about 8500; and (B) a carboxyl terminated polyether in the amount of between about 0.8 and 1.2 carboxyl groups for each epoxy group in the copolymer. In addition, the powder coating compositions may include additives such as catalysts, flow control agents, antistatic agents, pigments, plasticizers, etc.

PRIOR ART

The use of glycidyl methacrylate copolymers and dicarboxylic acid crosslinking agents in a liquid paint system is described in U.S. Pat. No. 2,857,354. However, the powder coating compositions of this invention are substantially different than the liquid paint compositions described in the examples of that patent. The difference can be best illustrated by attempting to prepare powder coating compositions by evaporating the solvents from the liquid paint systems described in the examples of the patent. Dry powders cannot be prepared from the compositions of Example 4 and 5 of the patent. Powders prepared from the compositions of Examples 1, 2, 3 and 6, when deposited on a metal panel, do not fuse together to form a smooth and glossy film when the panels are baked at 150° to 220°C for 20 minutes. The baked coatings on test panels are not smooth, but rather, are rough. Also, the baked coatings exhibit very low gloss, poor adhesion and lack of flexibility. It, therefore, can be concluded that compositions which are generally suitable for liquid paints are not necessarily made suitable for powder paints merely by evaporating the solvents threfrom.

The use of dicarboxylic acid as a crosslinking agent for glycidyl methacrylate terpolymers is mentioend in U.S. Pat. No. 3,058,947. In order to test these materials, compositions of Example VII of the patent are dried by evaporating solvents under vacuum. The materials are ground to pass through a 200 mesh screen. Samples of the ground powder are deposited on metal panels and baked at 160°C for 45 minutes. The coatings obtained show an abundance of craters, are inferior in gloss and smoothness, and lack the impact properties described in Example VII. It is, therefore, concluded that there is a substantial difference in paint films produced on a panel when the coating is produced on one hand by a liquid system and, on the other hand, by a powder system. Other improvements specific to the powders are needed in order to obtain paints of acceptable quality. The reason for the difference in properties and appearance between powder coatings derived by solvent evaporation from such liquid paints and the liquid paints themselves is not clear. It is, however, certain that the powder obtained by drying such a liquid paint composition is not useful as a powder coating composition.

DETAILED DESCRIPTION OF THE INVENTION

Epoxy Functional Copolymer

The principal material in the powder coating compositions of this invention is an epoxy functional copolymer which may be formed by conventional free radical induced polymerization of suitable unsaturated monomers. The term "copolymer" as used herein means a polymer of two or more different monomers.

The copolymers used in the invention contain between about 8 and about 30 weight percent, preferably between about 10 and about 25 weight percent, and still more preferably between about 12 and about 20 weight percent of a glycidyl ester of a monoethylenically unsaturated carboxylic acid, e.g., glycidyl acrylate and glycidyl methacrylate. These monomers provide the copolymer with its pendant epoxy functionality.

The remainder of the monomers forming the epoxy functional copolymer, i.e., between about 92 and about 70 weight percent, preferably between about 90 and about 75 weight percent, and most preferably between about 88 and about 80 weight percent, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acid, e.g., methyl methacrylate, ethyl acrylate, butyl acrylate, butyl methacrylate, hexyl acrylate, 2-ethylhexyl acrylaate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile and vinyl acetate may be included in the copolymer as modifying monomers. However when employed, these modifying monomers should constitute only between about 0 and about 35 weight percent of the monomers in the copolymer.

The expoxy functional copolymers used in the powder coating compositions of this invention have a glass transition temperature (Tg) between about 40°C and about 90°C, preferably between about 50°C and about 80°C, and most preferably between about 50°C and about 70°C. The molecular weight ($\overline{M}_n$) range for the copolymer may be between about 2500 and about 8500, preferably between about 3000 and about 6500, more preferably between about 3,000 and about 4,000. A preferred copolymer has a glass transition temperature between about 50°C and about 80°C and a molecular weight of between about 3000 and about 6500. A still more preferred copolymer has a glass transition temperature between about 55°C and about 70°C and a molecular weight between about 3000 and about 4000.

In preparing the copolymer, the epoxy functional monomer and the remaining monoethylenically unsaturated monomers are mixed and reacted by conventional free radical initiated polymerization in such proportions as to obtain the copolymer desired. A large number of free radical initiators are known to the art and are suitable for this purpose. These include: benzoyl peroxide; lauryl peroxide; t-butylhydroxy peroxide; acetylcyclohexane slufonyl peroxide; diisobutyryl peroxide; di-(2-ethylhexyl) peroxydicarbonate; diisopropyl peroxydicarbonate; t-butylperoxypivalate; decanoyl peroxide, azobis(2-methyl-propionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a nonsolvent for the copolymer such as hexane, octane, or water under suitable agitation conditions. The copolymer thus obtained is then further dried so that it contains less than 3 percent of the materials that volatilize at the temperatures used for baking the coatings. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coatings.

The molecular weight and molecular weight distribution of the epoxy functional copolymer is important in obtaining outstanding powder coating compositions. While the molecular weight ($\overline{M}_n$) ranges from about 2500 to about 8500, the copolymer component must not contain significant amounts of higher molecular weight fractions. No more than 5% of the copolymer should be of molecular wegith greater than 20,000 and the molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

Carboxyl Terminated Polyether

The crosslinking agents of the powder coating compositions of this invention are carboxyl terminated polyethers which are present in an amount ranging from about 0.8 to about 1.2 carboxyl groups for each epoxy group in the above-discussed copolymer. The carboxyl groups of the carboxyl terminated polyethers react with the epoxy groups of the copolymer upon exposure to heat to form a hard cured film.

The carboxyl terminated polyethers preferred for use as crosslinking agents in the powder coating compositions of the invention have the general structure:

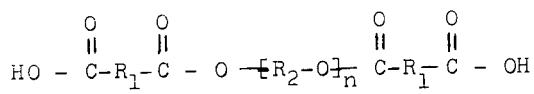

where $n$ is between 5 and 50; $R_1$ is selected from the group consisting of (1) alkyl groups containing 2 to 12 carbon atoms, (2) aromatic groups, (3) heterocyclic groups and (4) alicyclic groups; and $R_2$ is selected from the group consisting of (1) alkyl groups containing 2 to 12 carbon atoms and (2) cyclic groups containing up to 12 carbon atoms.

Such preferred carboxyl terminated polyethers have number average molecular weights ($\overline{M}_n$) between about 500 and about 5000, but preferably between about 700 and about 3500 and may be prepared in accordance with procedures well known in the prior art. One such procedure involves a two step process. First, an alkylene oxide or substituted alkylene oxide is reacted with a polyol, preferably a saturated, aliphatic or aromatic polyol, to form a hydroxy-terminated polyether. Second, the hydroxy-terminated polyether is converted into a carboxyl terminated polyether by reacting with a carboxylic acid or a carboxylic acid anhydride.

The polyols which are reacted with the alkylene oxides or substituted alkylene oxides to form the hydroxy terminated polyethers may be selected from aliphatic polyols, aromatic polyols and alicyclic polyols, with saturated aliphatic and aromatic polyols being preferred. Representative of the many polyols for use in preparing the carboxyl terminated polyether crosslinking agents useful in the compositions of the invention are: ethylene glycol; propylene glycol; diethylene glycol; glycerol; trimethylol propane; trimethylol ethane; 1,2,6-hexanetriol; 1,1,3-tris (4-hydroxyphenyl) propane; pentaerythritol; sorbitol; manitol; dulcitol; diglycerol; etc.

Either alkylene oxides or substituted alkylene oxides may be reacted with the above described polyols to form a hydroxy terminated polyether. Among the many suitable oxides known in the art are: ethylene oxide; propylene oxide; butylene oxide; pentene oxide; styrene oxide; cyclohexane oxide; 1,4-epoxy cyclohexane oxide; etc.

The carboxylic acids which may be reacted with the above-discussed polyethers may be selected from aliphatic carboxylic acids, aromatic carboxylic acids, alicyclic carboxylic acids and heterocyclic carboxylic acids. Representative of the many carboxylic acids falling within these categories are: adipic acid; azelaic acid; o-phthalic acid; terephthalic acid; 1,2 cyclohexane dicarboxylic acid; 1,4'cyclohexane dicarboxyl acid; 2,3-bicycloheptene dicarboxylic acid; 2,3-bicyclooctane dicarboxylic acid; 4,4'-sulfonyldibenzoic acid; etc. The carboxylic acid anhydrides may be anhydrides of the above-enumerated types of carboxylic acids; and, by way of example include such anhydrides as: succinic anhydride, hexahydrophthalic anhydride; phthalic anhydride; trimellitic anhydride; pyromellitic dianhydride; chlorendic anhydride, etc.

The exact reaction conditions necessary for forming the hydroxy terminated polyether intermediate and the carboxyl terminated polyether in accordance with the above-two-step procedure are well known in the prior art and will be apparent to those skilled in the art. For a more detailed discussion of suitable polyethers and preparation thereof, attention is directed to Polyurethanes: Chemistry and Technology Volume I, Saunders and Frisch, Interscience Publishers, New York, 1962.

Additional Additives

The coating compositions formed in accordance with the teachings of this invention may include a small amount, generally from about 0.05% by weight to about 1.0% by weight of the total weight of the powder composition, of a catalyst in order to increase the crosslinking rate of the powder coating during baking. Baking temperatures ordinarily are in the range of about 130°C to about 200°C and the catalyst should produce a gel time at the baking temperature of between about one minute and about 40 minutes. Preferably, however, the gel time is in the range of about 1 to about 12 minutes and most preferably is in the range of about 2 to about 8 minutes. Among the many suitable catalysts, which are preferably solid at room temperature and have a melting point of from 50°C to 200°C are tetraalkylammonium salts, imidazole type catalysts, tertiary amines and metal salts of organic carboxylic acids. Suitable tetraalkyl ammonium salt catalysts include: tetrabutyl ammonium chloride (bromide or iodide); tetraethyl ammonium chloride (bromide or iodide); tetramethyl ammonium chloride (bromide or iodide); trimethyl benzyl ammonium chloride; dodecyl dimethyl (2-phenoxyethyl) ammonium bromide and diethyl (2-hydroxy ethyl) methyl ammonium bromide. Suitable catalysts of the imidazole type include: 2-methyl-4-ethyl imidazole, 2-methyl imidazole, imidazole, 2-[(N-benzlanilino)methyl]-2-imidazoline phosphate and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acids which are catalysts for the powder coatings of the invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The powder paint composition also may advantageously include a flow control agent in an amount ranging from about 0.05 weight percent to about 4.0 weight percent of the total powder composition. In general the flow control agent should be a polymer having a number average molecular weight of at least 1,000 and a glass transition temperature at least 50°C below the glass transition temperature of the epoxy functional copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($\overline{M}_n$) above 1,000, preferably above 5,000 and most preferably between about 6,000 and about 20,000. Among the preferred acrylic polymers useful as flow control agents are polylauryl acrylate, polybutyl acrylate, poly(2-ethylhexyl acrylate), polylauryl methacrylate and polyisodecyl methacrylate.

Although acrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2,500 and perfluorooctanoic acid is a useful flow control agent. Polymeric siloxanes of molecular weight over 1,000 advantageously 1,000 to 20,000, may also be useful as flow control agents, e.g., alkyl substituted siloxanes such as polydimethyl siloxane, or polymethylphenyl siloxane, polydiphenyl siloxane, and halogenated siloxanes such as poly(3,3,3-trifluoropropyl methyl siloxane), poly (perfluorodimethyl siloxane), poly (pentafluorophenylmethyl siloxane), etc.

Since the powder coating compositions of the invention may be applied to articles by electrostatic spray techniques, the composition may include a small weight percent of an antistatic agent. In particular, the anti-static agent is included in a range of from about 0.05 to about 1.0 weight percent of the total powder composition. Suitable anti-static agents include, but are not limited to, tetraalkyl ammonium salts as discussed previously and which also serve as catalysts. Other suitable antistatic agents include: alkyl poly (ethylenoxy) phosphate or alkylaryl poly(ethyleneoxy) phosphates such as ethyl benzyl poly(ethyleneoxy) phosphate; polyethyleneimine; poly(2-vinyl pyrrolidone); pyridinium chloride; poly(vinyl pyridinium chloride); polyvinyl alcohol; and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate; diisooctyl adipate; dicyclohexyl adipate; triphenyl phosphate; tricresyl phosphate; tributyl phosphate; dibutyl phthalate; dioctylphthalate; butyl octyl phthalate; dioctyl sebacate; butyl benzyl sebacate; dibenzyl sebacate, butanediol-1,4-diglycidyl ether and cellulose acetate butyrate.

In order to give individual powder coating compositions a suitable color, a pigment may be included. In general the pigment forms from about 6 to about 35 weight percent of the total powder coating composition. Pigments which are suitable for powder coating compositions include, but are not limited to the following: basic lead silica chromate, 30 percent by weight (orange); titanium dioxide, 30 percent by weight (white); titanium dioxide, 15 weight percent, plus ultra marine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); quindo red, 5 weight percent, plus titanium dioxide, 16 weight percent (red); and iron oxide transparent orange pigment, 10 weight percent (orange). Metallic pigment such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation. Unless otherwise specified all references to "parts" is intended to mean parts by weight.

EXAMPLE I

The monomers glycidyl methacrylate 15% by weight, methyl methacrylate 45% by weight and butyl methacrylate 40% by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°–112°C) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 100°C. Drying is continued until the solvent content of the copolymer is below 3 percent. The trays are cooled and the copolymer collected and ground to pass through 20 mesh screen. The copolymer has a glass transition temperature of 53°C and a molecular weight ($M_n$) of 4000.

A carboxyl terminated polyether is prepared in the following manner. Into a steel vessel are placed 15.2 parts of 1,2-propylene glycol and anhydrous sodium hydroxide under a nitrogen atmosphere. The vessel is then pressurized to 75 psig with nitrogen and heated slowly to 125°C. The pressure is then released and 116 parts of propylene oxide introduced. The reaction is maintained at 125°c under a pressure of 35 to 50 psig for 14 hours. The mixture is then cooled, the sodium hydroxide catalyst neutralized with sulfuric acid and the product filtered. The hydroxy terminated polyether and the product filtered. The hydroxy terminated polyether is then converted to a carboxyl terminated polyether by combining the same with 33.2 parts of o-phthalic anhydride in a flask equipped with a condenser and distilling. The flask is heated to 180°C at which point distillation starts and the reaction is maintained at this temperature until distillation of all water is substantially complete. The temperature is then slowly raised to 230°C and maintained for 2 to 3 hours. The contents of the flask are allowed to cool to 150°C and then poured into an evaporating dish and cooled to room temperature. The product is ground, washed several times with water, filtered and dried. The resultant carboxyl terminated polyether has a molecular weight ($\overline{M}_n$) of 1500.

One hundred parts of the ground epoxy copolymer and 79 parts of the groud carboxyl-terminated polyether are added to the following materials:

| | |
|---|---|
| Tetrabutyl ammonium bromide | 0.2 parts |
| Polylauryl acrylate ($\overline{M}_n$=10,000) | 0.5 parts |
| Titanium dioxide | 30 parts |

The materials are mixed together in a ball mill for 2 hours. The mixture is milled rolled at 85°C to 90°C for pass through a 140 mesh screen.

The resulting powder thus obtained is a powder coating composition of the invention. The powder is sprayed on an electrically grounded, steel panel by using an electrostatic powder spray gun operating at 50 KV charging voltage. After spraying, the panel is heated at 175°C for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE II

A monomer mixture having the following composition is prepared: glycidyl methacrylate 8% by weight; methyl methacrylate 52% by weight and butyl methacrylate 40% by weight. The monomer mixture is processed in the same manner as Example I. The resultant epoxy functional copolymer has a glass transition temperature of 58°C and a molecular weight ($M_n$) of 4,000.

A carboxyl terminated polyether having a molecular weight ($\overline{M}_n$) of 2300 is prepared in the manner described in Example I except that: (1) the hydroxy terminated polyether is prepared by reacting 12.0 parts of trimethylolethane with 174.0 parts of propylene oxide; and (2) the hydroxy terminated polyether is converted to a carboxyl terminated polyether using 50.0 parts of terephthalic acid.

One hundred parts of the epoxy functional copolymer and 43 parts of the carboxyl terminated polyether are combined and mixed with the same additional ingredients described in Example I. The powder paint is applied to test panels and cured to give a durable, solvent resistant coating.

EXAMPLE III

A monomer mixture having the following composition is prepared: glycidyl acrylate 10% by weight, methyl methacrylate 50% by weight, butyl methacrylate 30% by weight and vinyl acetate 10% by weight. A copolymer is formed from this monomer mixture in accordance with the same procedure as is outlined in Example I. In this case, 3% by weight of the catalyst AIBN is added.

A carboxyl terminated polyether having a molecular weight ($\overline{M}_n$) of 2300 is prepared in the manner described in Example I except that: (1) the hydroxy terminated polyether is prepared by reacting 13.4 parts of trimethylolpropane and 174.0 parts of propylene oxide and (2) the hydroxy terminated polyether is converted to a carboxyl terminated polyether by reacting with 50.0 parts of terephthalic acid.

One hundred parts of the epoxy functional copolymer and 58 parts of the carboxyl terminated polyether are combined with the following:

| | |
|---|---|
| Tetrabutylammonium bromide | 2 parts |
| Poly(2-ethylhexyl acrylate) | 3.5 parts |
| Carbon black | 6 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 160°C for 10 minutes is of good quality. Also, the coating obtained on each test panel is insoluble in toluene, gasoline, methanol and butanone.

EXAMPLE IV

A monomer mixture having the following composition is prepared: glycidyl methacrylate 15% by weight, butyl acrylate 20% by weight and methyl methacrylate 65% by weight. The monomer is reacted as set forth in Example I in order to produce a copolymer. Four percent by weight of the catalyst AIBN is employed in reacting the monomer mixture to form the copolymer. The copolymer has a glass transition temperature of 50°C and a molecular weight of 3000.

A carboxyl terminated polyether having a molecular weight ($\overline{M}_n$) of 1500 is prepared in the manner described in Example I except that the hydroxy terminated polyether is converted into a carboxyl terminated polyether by reacting with 34.0 parts of 1,4 cyclohexanedicarboxylic acid.

One hundred parts of the epoxy functinoal copolymer and 80 parts of the carboxyl terminated polyether are combined with the following:

| | |
|---|---|
| Triethylene diamine | 0.1 parts |
| Tetraethylammonium chloride | 0.5 parts |
| Polylaurylmethacrylate ($\overline{M}_n$=6000) | 2 parts |
| Phthaloycanine green | 7 parts |
| Titanium dioxide | 10 parts |

The above described materials are processed as described in Example I in order to produce a powder coating composition. The powder coating composition is applied to test panels as described in Example I and baked on the panels at a temperature of 150°C for 15 minutes.

The coating obtained has good adhesion to steel, glass, brass, zinc, aluminum, copper and bronze and is insoluble in toluene, gasoline, methanol and butanone.

EXAMPLE V

A monomer mixture having the following composition is prepared: glycidyl methacrylate 15% by weight, methyl methacrylate 50% by weight and styrene 35% by weight. The monomers are reacted in accordance with the procedure set forth in Example I with 3% by weight of the catalyst AIBN being utilized. The resulting ground copolymer has a molecular weight of 4500 and a glass transition temperature of 90°C.

A carboxyl terminated polyether having a molecular weight ($\overline{M}_n$) of 1800 is prepared in the manner described in Example I except that: 7.6 parts of 1,2 propylene glycol and 144 parts of 1,2 butylene glycol are reacted to form the hydroxy terminated polyether.

One hundred parts of the epoxy functional copolymer and 93 parts of the carboxyl terminated polyether are combined with the following:

| | |
|---|---|
| Tetramethylammonium chloride | 1 part |
| Poly(2-ethylhexyl acrylate) | 2 parts |
| Ferrite yellow | 7 parts |
| Titanium dioxide | 10 parts |

This mixture is processed as described in Example I in order to form a powder coating composition. The powder coating composition is applied to test panels as described in Example I. The panels are baked at a temperature of 180°C for 5 minutes. The adhesion quality of the powder coating after baking on the various test panels is good. The coating on each panel possesses good solvent and scratch resistance.

EXAMPLE VI

A monomer mixture having the following composition is formed: glycidyl methacrylate 10% by weight, methyl methacrylate 33% by weight, isobutyl acrylate 27% by weight, alpha methyl styrene 15% by weight and methacrylonitrile 15% by weight. The monomer mixture is reacted in the same manner as described in Example I.

A carboxyl terminated polyether having a molecular weight ($\overline{M}_n$) of 2500 is prepared as follows. Pentaerythritol is treated with propylene oxide in a molar ratio of 1 to 30 in the presence of sodium. A brown polymer is formed at 75°C in approximately 20 minutes. The resultant polymer (180 parts) is converted to a carboxyl terminated polyether by reacting with 75.2 parts of azelaic acid in accordance with the procedure of Example I.

One hundred parts of the epoxy functional copolymer and 44 parts of the carboxyl terminated polyether are combined with the following:

| | |
|---|---|
| Dodecyldimethyl (2-phenoxy-ethyl) ammonium bromide | 0.5 parts |
| Polyethylene glycol perfluoro octonoate ($\overline{M}_n$=3400) | 2 parts |
| Black iron oxide | 10 parts |

The mixture so formed is processed as described in Example I to produce a powder coating composition. This powder coating composition is applied to test panels as it is described in Example I. The coated panels are baked at 165°C for 15 minutes. The coating on each panel has good adhesion and solvent resistance.

EXAMPLE VII

A monomer mixture having the following composition is prepared: glycidyl methacrylate 20% by weight, methyl methacrylate 40% by weight and butyl methacrylate 40% by weight. A copolymer is formed from this monomer mixture in accordance with the same procedure as is outlined in Example I. In this case, 6% by weight of the catalyst AIBN is added. The copolymer produced has a glass transition temperature of 51°C and a molecular weight of 8500.

A carboxyl terminated polyether having a molecular weight ($\overline{M}_n$) of 2300 is prepared in the manner described in Example I except that: (1) 9.2 parts of glycerol and 174.0 parts of propylene oxide are reacted to form the hydroxy terminated polyether; and (2) the hydroxy terminated polyether is converted to a carboxyl terminated polyether by reaction with 50 parts terephthalic acid.

One hundred parts of the epoxy functional copolymer and 98 parts of the carboxyl terminated polyether are combined with:

| | |
|---|---|
| Tetrabutylammonium chloride | 0.1 parts |
| Polybutylacrylate ($\overline{M}_n$=9000) | 4 parts |
| Titanium dioxide | 15 parts |
| Transparent blue | 4 parts |
| Metallic aluminum flakes | 4 parts |

The above ingredients are mixed together and processed in accordance with the procedure of Example I to obtain a powder coating composition. The powder coating composition is sprayed on various test panels of steel, glass, brass, zin, aluminum, copper and bronze. The coating obtained on each test panel after curing of the powder coating composition at a temperature of 200°C for 10 minutes is of good quality, is solvent and scratch resistant, and has a metallic appearance.

EXAMPLE VIII

A monomer mixture having the following composition is formed: glycidyl acrylate 18% by weight, ethyl acrylate 15% by weight, methyl methacrylate 45% by weight, vinyl chloride 22% by weight. The monomer mixture is polymerized by using 2 weight percent of AIBN as the initiator.

A carboxyl terminated polyether having a molecular weight ($\overline{M}_n$) of 1800 is prepared in the manner described in Example I except that: (1) 7.6 parts of 1,2 propylene glycol and 144 parts of 1,2 butylene oxide are reacted to form the hydroxy terminated polyether; and (2) the hydroxy terminated polyether is converted to a carboxy terminated polyether by reacting with 34.8 parts of adipic acid.

One hundred parts of the epoxy functional copolymer and 120 parts of the carboxyl terminated polyether are combined with:

| | |
|---|---|
| Trimethyl benzyl ammonium chloride | 0.1 parts |
| Poly(2-ethylhexyl acrylate) ($\overline{M}_n$=11,000) | 2 parts |
| Carbon black | 6 parts |

The above materials are mixed and processed as set forth in Example I. The resulting powder coating composition is applied to test panels as specified in Example I. The coating composition is baked at 170°C for 15 minutes. All the painted panels exhibit good adhesion and solvent resistant properties.

EXAMPLE IX

A monomer mixture is formed having the following composition: glycidyl methacrylate 12% by weight methyl methacrylate 50% by weight, 2-ethylhexyl acrylate 10% by weight and acrylonitrile 28% by weight. The monomer mixture is processed as set forth in Example I in order to form a copolymer. Four percent by weight of the catalyst AIBN is added. The copolymer formed has a glass transition temperature of 60°C and a molecular weight of 4,000.

A carboxyl terminated polyether having a molecular weight ($\overline{M}_n$) of 2300 is prepared in the manner described in Example I except that: (1) 13.4 parts of 1,2,6 hexanetriol and 174.0 parts of propylene oxide are reacted to form the hydroxy terminated polyether; and (2) 50.0 parts of terephthalic acid are reacted with the polyether to form the carboxyl terminated polyether.

One hundred parts of the epoxy functional copolymer and 65 parts of the carboxyl terminated polyether are combined with:

| | |
|---|---|
| Stannous octoate | 0.5 parts |
| Tetraethylammonium bromide | .05 parts |
| Polyethylene glycol perfluoro octoate ($\overline{M}_n$=3500) | 2 parts |
| Quindo red | 4 parts |
| Metallic aluminum flakes | 4 parts |

The mixture above described is processed as set forth in Example I to produce a powder coating composition. The powder coating composition is applied to test panels as described in Example I. The panels are baked at 150°C for 20 minutes. The adhesion to the panels of the powder coating is good, each of the coatings possess good solvent resistance and has a metallic appearance.

EXAMPLE X

A monomer mixture having the following composition is prepared: glycidyl methacrylate 15% by weight, methyl methacrylate 32% by weight, ethyl acrylate 15% by weight, isobutyl acrylate 8% by weight, and styrene 30% by weight. A copolymer is formed from this monomer mixture in accordance with the same procedure as is outlined in Example I. In this case, 3% by weight of the catalyst AIBN is added.

A carboxyl terminated polyether having a molecular weight ($\overline{M}_n$) of 2500 is prepared in the manner described in Example I except that: (1) 32.0 parts of 1,1,3-tri (4-hydroxyphenyl) propane and 174 parts of propylene oxide are reacted to form the hydroxy terminated polyether and 50.0 parts of terephthalic acid are reacted with the polyether to form a carboxyl terminated polyether.

One hundred parts of the epoxy functional copolymer and 83 parts of the carboxyl functional polyether are combined with:

| | |
|---|---|
| Tetraethylammonium bromide | 1 part |
| Polyisodecyl methacrylate ($\overline{M}_n$=5000) | 1.5 parts |
| Titanium dioxide | 30 parts |

The above ingredients are mixed together and processed in accordance with the procedure of Example I to obtain a powder coating composition. The powder coating composition is sprayed on various tests panels of steel, glass, brass, zinc, aluminum, copper and bronze. The coatings obtained on each test panel after curing of the powder coating composition at a temperature of 120°C for 15 minutes is of good quality and has good adhesion characteristics. The powder coating composition on each panel is resistant to the solvents previously mentioned.

EXAMPLE XI

A monomer mixture having the following composition is prepared: glycidyl acrylate 15% by weight, methyl methacrylate 40% by weight, 2-ethylhexyl acrylate 15% by weight, alpha methyl styrene 20% by weight and acrylonitrile 10% by weight. A copolymer is formed from this monomer mixture using 4% by weight of the catalyst AIBN. A phenolic hydroxy terminated resin is prepared as described in Example I.

A carboxyl terminated polyether having a molecular weight ($\overline{M}_n$) of 2900 is prepared in the manner described in Example I except that: (1) 32 parts of 1,1,3-tri-(4-hydroxyphenyl) propane and 220 parts of ethylene oxide are reacted to form the hydroxy terminated polyether; and (2) 50.0 parts of terephtahlic acid are reacted with the polyether to form a carboxyl terminated polyether.

One hundred parts of the epoxy functional copolymer and 95 parts of the carboxyl terminated polyether are combined with:

| | |
|---|---|
| Tetraethylammonium bromide | 0.4 parts |
| Poly(2-ethylhexyl acrylate) | 2 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 170°C for 20 minutes is of good quality and resistant to the aforementioned solvents.

EXAMPLE XII

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed from this monomer mixture in accordance with the same procedure as is outlined in Example I. In this case, 1.5% by weight of the catalyst AIBN is added. The copolymer produced has a glass transition temperature of 40°C and a molecular weight of 7500.

A carboxyl terminated polyether having a molecular weight ($\overline{M}_n$) of 2800 is prepared in the manner described in Example I except that: (1) 13.4 parts of the trimethylolpropane and 174.0 parts of propylene oxide are reacted to form the hydroxy terminated polyether; and (2) 91.6 parts of 4,4'-sulfonyldibenzoic acid are reacted with the polyether to form a carboxyl terminated polyether.

One hundred parts of the epoxy functional copolymer and 140 parts of the carboxyl terminated polyether are combined with:

| | |
|---|---|
| Zinc octoate | 0.8 parts |
| Tetrabutylammonium iodide | 1.0 parts |
| Polybutyl acrylate | 2.0 parts |

-Continued

| | |
|---|---|
| Iron oxide transparent orange | 4 parts |
| Metallic aluminum flakes | 4 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 140°C for 20 minutes is of good quality and is solvent and scratch resistant.

EXAMPLE XIII

A monomer mixture having the following composition is prepared: glycidyl methacrylate 15% by weight, butyl methacrylate 15% by weight, ethyl acrylate 15% by weight, methyl methacrylate 30% by weight and styrene 25% by weight. A A copolymer is formed from this monomer mixture in accordance with the same procedure as is outlined in Example I.

A carboxyl terminated polyether having a molecular weight ($\overline{M}_n$) of 2400 is prepared in the manner described in Example I except that: (1) 13.4 parts of trimethylolpropane and 174.0 parts of propylene oxide are reacted to form the hydroxy terminated polyether; and (2) 56.4 parts of azelaic acid are reacted with the polyether to form the carboxyl terminated polyether.

One hundred parts of the epoxy functional copolymer and 80 parts of the carboxyl terminated polyether are combined with:

| | |
|---|---|
| Tetraethylammonium bromide | 1.0 parts |
| Polylauryl acrylate | 0.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 180°C for 10 minutes is of good quality and is resistant to the aforementioned solvents.

EXAMPLE XIV

A monomer mixture having the following composition is prepared: glycidyl methacrylate 15% by weight, 2-ethylhexyl acrylate 10% by weight, methyl methacrylate 50% by weight, methacrylonitrile 15% by weight and alpha methyl styrene 10% by weight. A copolymer is formed from this monomer mixture in accordance with the same procedure as is outlined in Example I. In this case, 4% by weight of the catalyst AIBN is added.

A carboxyl terminated polyether is prepared in the manner described in the manner of Example VI except that: 13.6 parts of pentaerythritol and 216.0 parts of butylene oxide are reacted to form a hydroxy terminated polyether having a molecular weight ($\overline{M}_n$) of 3000.

One hundred parts of the epoxy functional copolymer and 52 parts of the carboxyl terminated polyether are combined with:

| Tetraethylammonium bromide | 0.5 parts |
| Polylauryl acrylate | 2.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 135°c for 30 minutes is of good quality. Also, the coatings are resistant to an insoluble in toluene, gasoline, methanol and butanone.

EXAMPLE XV

A monomer mixture having the following composition is prepared: glycidyl acrylate 25% by weight, methyl methacrylate 50% by weight and butyl methacrylate 25% by weight. The monomers are reacted as described in Example I to produce a copolymer. In this case, 6% by weight of the catalyst AIBN is employed.

A hydroxy terminated polyether having a molecular weight ($\overline{M}_n$) of 2100 is prepared in the manner described in Example VI escept that 13.6 parts of pentaerythritol and 132 parts of ethylene oxide are reacted to form the hydroxy terminated polyether.

One hundred parts of the epoxy functional copolymer and 93 parts of the carboxyl terminated polyether are combined with:

| 2-methyl-4-ethylimidazole | 0.05 parts |
| Dibutyl poly(ethyleneoxy phosphate) | 0.05 parts |
| Polyisododecyl methacrylate | 4 parts |
| Titanium dioxide | 10 parts |
| Phthalocyanine blue | 7 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 200°C for 10 minutes is of good quality, is solvent and scratch resistant and has a metallic appearance.

EXAMPLE XVI

A monomer mixture having the following composition is prepared: glycidyl methacrylate 10% by weight, methyl methacrylate 67% by weight, and n-butyl methacrylate 23% by weight. A copolymer is formed from this monomer mixture in accordance with the procedure as is outlined in Example I. In this case, 4% by weight of the catalyst AIBN is added. The copolymbr produced has a glass transition temperature of 75°C and a molecular weight of 3000.

A carboxyl terminated polyether having a molecular weight of 2200 is prepared in the manner described in Example I except that: (1) 10.6 parts of diethylene glycol and 174.0 parts of propylene oxide are reacted to form the hydroxy terminated polyether; and (2) 37.6 parts of azelaic acid are reacted with the polyether to form the carboxyl terminated polyether.

One hundred parts of the epoxy functional copolymer and 77 parts of the carboxyl terminated polyether are combined with:

| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 180°C for 15 minutes is of good quality, also, each of the test panels coating's is resistant to and insoluble in toluene, gasoline, methanol and butanone.

EXAMPLE XVII

A monomer mixture having the following composition is prepared: glycidyl acrylate 30% by weight, methyl methacrylate 60% by weight, and n-butyl methacrylate 10% by weight. A copolymer is formed from this monomer mixture in accordance with the procedure as is outlined in Example I. In this case, 4% by weight of the catalyst AIBN is added.

A hydroxy terminated polyether having a molecular weight ($\overline{M}_n$) of 3000 is prepared in the manner described in Example I except that: (1) 9.2 parts of glycerol, 240 parts of styrene oxide and 12 parts of propylene oxide are reacted to form the hydroxy terminated polyether; and 50.0 parts of terephthalic acid are reacted with the polyether to form the carboxyl terminated polyether.

One hundred parts of the epoxy functional copolymer and 200 parts of the carboxyl terminated copolymer are combined with:

| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 170°C for 15 minutes is of good quality. Also, each of the test panel coating's is resistant to and insoluble in toluene, gasoline, methanol and butanone.

EXAMPLE XVIII

A monomer mixture having the following composition is prepared: glycidyl methacrylate 20% by weight, butyl acrylate 40% by weight, methyl methacrylate 10% by weight and styrene 30% by weight. A copolymer is formed from this monomer mixture in accordance with the same procedure as is outlined in Example I. In this case, 4% by weight of the catalyst AIBN is added. The copolymer produced has a glass transition temperature of 40°C and a molecular weight of 3000.

A carboxyl terminated polyether having a molecular weight ($\overline{M}_n$) of 3100 is prepared in the manner described in Example I except that 13.4 parts of trimethylolpropane, 240 parts of styrene oxide, and 12 parts of propylene oxide are reacted to form the hydroxy terminated polyether; and (2) 50 parts of terephthalic acid is reacted with the polyether to form the carboxyl terminated polyether.

One hundred parts of the epoxy functional copolymer and 140 parts of the carboxyl terminated polyether are combined with:

| | |
|---|---|
| Tetraethylammonium bromide | 0.5 parts |
| Polylauryl acrylate | 1.0 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 130°C for 30 minutes is of good quality and resistant to the aforementioned solvents.

EXAMPLE XIX

The procedure of Example I is repeated with the exception that an equivalent amount of polydimethyl siloxane ($\overline{M}_n$ =5000) is substituted for the polylauryl acrylate as the flow control agent.

EXAMPLE XX

Examples I–XVIII are repeated with the exception that the flow control agent is omitted from the powder composition. The powders are sprayed on steel test panels and cured to form films thereon.

EXAMPLE XXI

The procedure of Example III is repeated with the exception that 0.8 parts of polydiphenyl siloxane ($\overline{M}_n$=10,000) is substituted for the poly(2-ethylhexyl acrylate) as the flow control agent.

EXAMPLE XXII

The procedure of Example IX is repeated with the exception that 0.5 parts of polymethylphenylsiloxane ($\overline{M}_n$ =8,000) is used as the flow control agent.

EXAMPLE XXIII

The procedure of Examples XI is repeated with the exception that 0.4 parts of poly(3,3,3-trifluoropropyl methyl siloxane) ($\overline{M}_n$=6,000) is substituted as the flow control agent.

EXAMPLE XXIV

The procedure of Example XIII is repeated with the exception that 0.7 parts of poly (perfluorodimethyl siloxane) ($\overline{M}_n$=11,000) is substituted for the flow control agent.

EXAMPLE XXV

The procedure of Example XVI is repeated with the exception that .30 parts of poly(pentafluorophenylmethyl) siloxane ($\overline{M}_n$=15,000) is substituted as the flow control agent.

In view of this disclosure, many modifications of this invention will be apparent to those skilled in the art. It is intended that all such modifications which fall within the true scope of this invention be included within the terms of the appended claims.

We claim:

1. A powder coating composition which, exclusive of pigments and other non-reactive components, comprises a coreactable mixture of:
   A. a copolymer of about 8 to about 30 weight percent of a glycidyl ester of a monoethylenically unsaturated acid and about 92 to about 70 weight percent of other monoethylenically unsaturated monomers, said copolymer having a glass transition temperature in the range of 40°C to 90°C and a molecular weight ($\overline{M}_n$) in the range of 2500 to 8500;
   B. a carboxyl terminated polyether in the amount of between about 0.8 and about 1.2 carboxyl groups for each epoxy group in the copolymer; and
   C. from about 0.05 weight percent to about 4.0 weight percent based on the total weight of the total coating composition of a polymeric flow control agent.

2. A powder coating composition in accordance with claim 1 wherein said copolymer has a glass transition temperature between about 50°C and about 80°C and a molecular weight ($\overline{M}_n$) between about 3000 and about 6500, said glycidyl ester being present in said copolymer from at least about 10 percent by weight to no more than about 25 percent by weight.

3. A powder coating composition in accordance with claim 1 wherein said copolymer has a glass transition temperature between about 55°C and about 70°C and a molecular weight ($\overline{M}_n$) in the range of about 3000 to about 4000, said glycidyl ester being present in said copolymer from at least about 12 percent by weight to no more than about 20 percent by weight.

4. A powder coating composition in accordance with claim 1 wherein said carboxyl terminated polyether has a molecular weight ($\overline{M}_n$) between about 500 and about 5,000.

5. A powder coating composition in accordance with claim 1 wherein said carboxyl terminated polyether has a molecular weight ($\overline{M}_n$) between about 700 and about 3500.

6. A powder coating composition in accordance with claim 1 wherein said monoethylenically unsaturated monomers consist essentially of monofunctional, alpha-beta olefinically unsaturated monomers.

7. A powder coating composition in accordance with claim 6 wherein said monofunctional, alpha-beta olefinically unsaturated monomers are acrylates.

8. A powder coating composition which, exclusive of pigments and other non-reactive components, comprises a coreactable mixture of:
   A. a copolymer of about 8 to about 30 weight percent of a glycidyl ester of a monoethylenically unsaturated acid and about 92 to about 70 weight percent of other monoethylenically unsaturated monomers, said copolymer having a glass transition temperature between about 40°C and about 90°C and a molecular weight ($\overline{M}_n$) between about 2500 and about 8500;
   B. a carboxyl terminated polyether in the amount of between about 0.8 and about 1.2 carboxyl groups for each epoxy group in the copolymer, said carboxyl terminated polyether having the general structure:

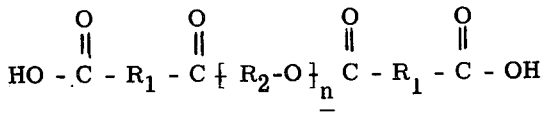

where $n$ is between 5 and 50; $R_1$ is selected from the group consisting of (1) alkyl groups containing 2 to 12 carbon atoms, (2) aromatic groups, (3) heterocyclic groups and (4) alicyclic groups; and $R_2$ is selected from the group consisting of (1) alkyl groups containing 2 to 12 carbon atoms and (2) cyclic groups containing up to 12 carbon atoms;

C. from about 0.05 weight percent to about 4.0 weight percent based on the total weight of the total coating composition of a polymeric flow control agent.

9. A powder coating composition in accordance with claim 8 wherein said copolymer has a glass transition temperature between about 50°C and about 80°C and a molecular weight ($\overline{M}_n$) between about 3000 and about 6500, said glycidyl ester being present in said copolymer from at least about 10 percent by weight to no more than about 25 percent by weight.

10. A powder coating composition in accordance with claim 8 wherein said copolymer has a glass transition temperature between about 55°C and about 70°C and a molecular weight ($\overline{M}_n$) in the range of about 3000 to about 4000, said glycidyl ester being present in said copolymer from at least about 12 percent by weight to no more than about 20 percent by weight.

11. A powder coating composition in accordance with claim 8 wherein said carboxyl terminated polyether has a molecular weight ($\overline{M}_n$) between about 500 and about 5,000.

12. A powder coating composition in accordance with claim 8 wherein said carboxyl terminated polyether has a molecular weight ($\overline{M}_n$) between about 700 and about 3500.

13. A powder coating composition in accordance with claim 8 wherein said monoethylenically unsaturated monomers consist essentially of monofunctional, alpha-beta olefinically unsaturated monomers.

14. A powder coating composition in accordance with claim 13 wherein said monofunctional, alpha-beta olefinically unsaturated monomers are acrylates.

15. A powder coating composition in accordance with claim 14 wherein said acrylates consist essentially of esters of $C_1-C_8$ monohydric alcohols and acrylic or methacrylic acid.

16. A powder coating composition in accordance with claim 13 wherein said monofunctional, alpha-beta olefinically unsaturated monomers consist essentially of a mixture of acrylates and vinyl hydrocarbons, said acrylates comprising greater than 50 weight percent of the monomer content of the copolymer.

17. A powder coating composition in accordance with claim 16 wherein said vinyl hydrocarbons are selected from the group consisting of styrene, alpha methyl styrene, vinyl toluene, t-butyl styrene and chlorostyrene.

18. A powder coating composition in accordance with claim 13 wherein said copolymer includes up to 35 weight percent of modifying monomers selected from the group consisting of vinyl chloride, acrylonitrile, methacrylonitrile and vinyl acetate.

* * * * *

UNITED STATES PATENT OFFICE
CERTIFICATE OF CORRECTION

Patent No. 3,880,946    Dated  April 29, 1975

Inventor(s)  Santokh S. Labana et al.

It is certified that error appears in the above-identified patent and that said Letters Patent are hereby corrected as shown below:

The term of this patent subsequent to

December 25, 1990, has been disclaimed.

Signed and Sealed this twenty-second Day of June 1976

[SEAL]

Attest:

RUTH C. MASON
*Attesting Officer*

C. MARSHALL DANN
*Commissioner of Patents and Trademarks*